(12) United States Patent
Yagyu

(10) Patent No.: US 7,832,876 B2
(45) Date of Patent: Nov. 16, 2010

(54) PROJECTION DISPLAY FOR CONVERTING LIGHT BEAMS INTO AN OPTICAL IMAGE

(75) Inventor: Shinji Yagyu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 585 days.

(21) Appl. No.: 11/896,433

(22) Filed: Aug. 31, 2007

(65) Prior Publication Data

US 2008/0218704 A1 Sep. 11, 2008

(30) Foreign Application Priority Data

Mar. 7, 2007 (JP) .............................. 2007-056754

(51) Int. Cl.
*G03B 21/28* (2006.01)
(52) U.S. Cl. .............................. 353/94; 353/99; 353/38; 362/234; 362/235
(58) Field of Classification Search .................... 353/94, 353/99, 38; 362/234, 235, 253
See application file for complete search history.

(56) References Cited

U.S. PATENT DOCUMENTS

| | | | |
|---|---|---|---|
| 5,765,934 A * | 6/1998 | Okamori et al. ................ | 353/94 |
| 6,196,699 B1 * | 3/2001 | Stanton ........................ | 362/235 |
| 6,224,217 B1 * | 5/2001 | Tanaka ......................... | 353/94 |
| 6,341,876 B1 | 1/2002 | Moss et al. | |
| 6,517,212 B2 | 2/2003 | Satou | |
| 7,503,660 B2 * | 3/2009 | Ikeda et al. .................... | 353/99 |
| 2005/0146891 A1 | 7/2005 | Hatakeyama | |
| 2005/0200812 A1 | 9/2005 | Sakata et al. | |
| 2006/0244929 A1 | 11/2006 | Sawai et al. | |

FOREIGN PATENT DOCUMENTS

| | | |
|---|---|---|
| JP | 2005-346093 A | 12/2005 |
| JP | 2006-78949 A | 3/2006 |
| JP | 2006-235642 A | 9/2006 |
| JP | 2006-308778 A | 11/2006 |

* cited by examiner

*Primary Examiner*—Seung C Sohn
(74) *Attorney, Agent, or Firm*—Birch, Stewart, Kolasch & Birch, LLP

(57) ABSTRACT

A projection display includes first and second light sources, a reflection/transmission member which partially transmits a first light beam from the first light source and partially reflects a second light beam from the second light source, and a light valve which converts the light beam from the reflection/transmission member into an optical image in accordance with a video signal. The reflection/transmission member has a reflective surface which is one side main surface, a light-shielding surface which is the other side main surface, and a plurality of openings extending through the both main surfaces. The first light beam is transmitted through the openings from the light-shielding surface to the reflective surface, and the second light beam is reflected off the reflective surface in the direction that the first light beam is transmitted.

9 Claims, 10 Drawing Sheets

F I G . 8
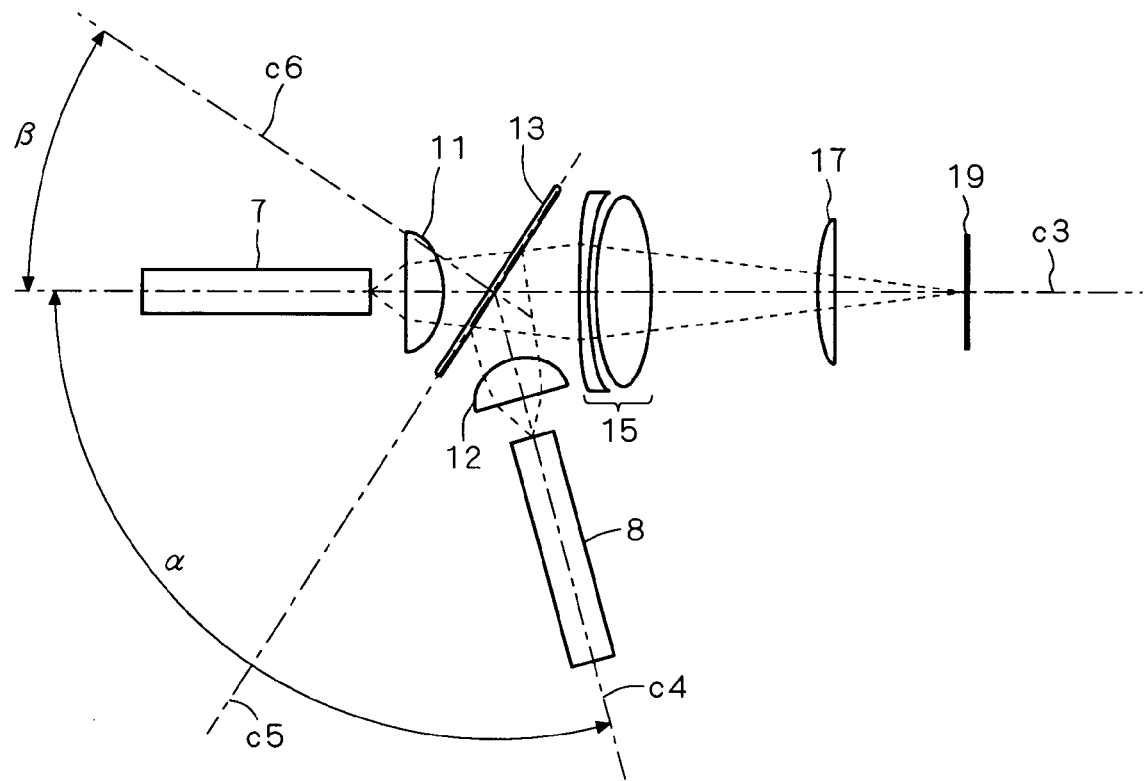

PROJECTION DISPLAY FOR CONVERTING LIGHT BEAMS INTO AN OPTICAL IMAGE

FIELD OF THE INVENTION

The present invention relates to a projection display which converts light beams from light sources into an optical image by a light valve in accordance with a video signal, and projects the optical image under magnification on a screen.

DESCRIPTION OF THE BACKGROUND ART

To obtain a large-scale image, a projection display has been used which converts light beams from light sources into an optical image by a small light valve in accordance with a video signal, and projects the optical image under magnification on a screen (Japanese Patent Application Laid-Open No. 2006-235642; hereinafter referred to as JP2006-235642). JP2006-235642 discloses the construction of an illumination optical system provided with an optical integrator made up of two lens array plates when applied to a liquid crystal projector which is a type of projection display. JP2006-235642 also discloses an optical system which utilizes two light sources and combines light beams from the two light sources using prism array plates.

In the above-described projection display, a light beam (circular beam) from each light source is finely split into stripes by a prism array plate, and the respective split sections of the light beam are alternately arrayed in one direction, so that light beams from the respective light sources are combined. Accordingly, the composite light beam has an almost elliptical shape with its width in one direction twice that of the almost circular original beam. This requires of the prism array plate to have its longer side twice the length of its shorter side. When a positive lens is disposed behind the prism array plate, this optical lens also needs to have a diameter almost twice that required in the case of a single light source, generally arising the need to construct a large-scale optical system, which results in cost disadvantage.

A light valve such as a liquid crystal panel and a DMD (digital micromirror device) currently being used widely is defined to have a rectangular aspect ratio of 4:3, 5:4, 16:9 or the like depending on the application of a projection display. As the composite light beam produced by combining light beams from two light sources has an aspect ratio closer to such aspect ratio, the efficiency in light utilization increases. However, the projection display disclosed in JP2006-235642 and a projection display in which two light sources are disposed in parallel for connecting light beams from the two light sources (Japanese Patent Application Laid-Open No. 2005-346093; hereinafter referred to as JP2005-346093) both have an aspect ratio of about 2:1, which disadvantageously degrades the efficiency in light utilization.

Unlike the projection displays disclosed in JP2006-235642 and JP2005-346093 each processing parallel light beams from two light sources as they are, there is another type of projection display which combines light beams from two light sources upon correcting the angle of optical axes of the light beams from the two light sources using an optical element (deflection member), (Japanese Patent Application Laid-Open No. 2006-308778). In this projection display, the light beams from the two light sources are combined side by side, causing the composite light beam to have an aspect ratio of 2:1 similarly to the aforementioned JP2006-235642 and JP2005-346093, which disadvantageously degrades the efficiency in light utilization. In addition, since the light beams from the two light sources are combined upon being concentrated on a point (focal point), an optical element (deflection member) provided in that focal point needs to be made of a high heat-resistant material, which is also disadvantageous in terms of reliability and costs.

SUMMARY OF THE INVENTION

An object of the present invention is to provide a projection display achieving a high efficiency in light utilization of a composite light beam produced from light beams from two light sources.

The projection display includes a first light source and a second light source, a reflection/transmission member partially transmitting a first light beam from the first light source and partially reflecting a second light beam from the second light source, and a light valve converting a light beam from the reflection/transmission member into an optical image in accordance with a video signal. The reflection/transmission member has a reflective surface which is one side main surface, a light-shielding surface which is the other side main surface, and a plurality of openings extending through both the one side main surface and the other side main surface. The first light beam is transmitted through the plurality of openings from the light-shielding surface to the reflective surface. The second light beam is reflected off the reflective surface in a direction that the first light beam is transmitted.

With concurrent lighting of the first and second light sources, the first and second light beams are combined by the reflection/transmission member, and an aspect ratio of the composite light beam is made almost equal to the aspect ratio (1:1) of the light beam originating at a single light source. This achieves a higher efficiency in light utilization than in conventional cases (where the aspect ratio is 2:1).

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a schematic view explaining the angular relationship of optical axes according to the first preferred embodiment;

DESCRIPTION OF THE PREFERRED EMBODIMENTS

First Preferred Embodiment

Figure 1:
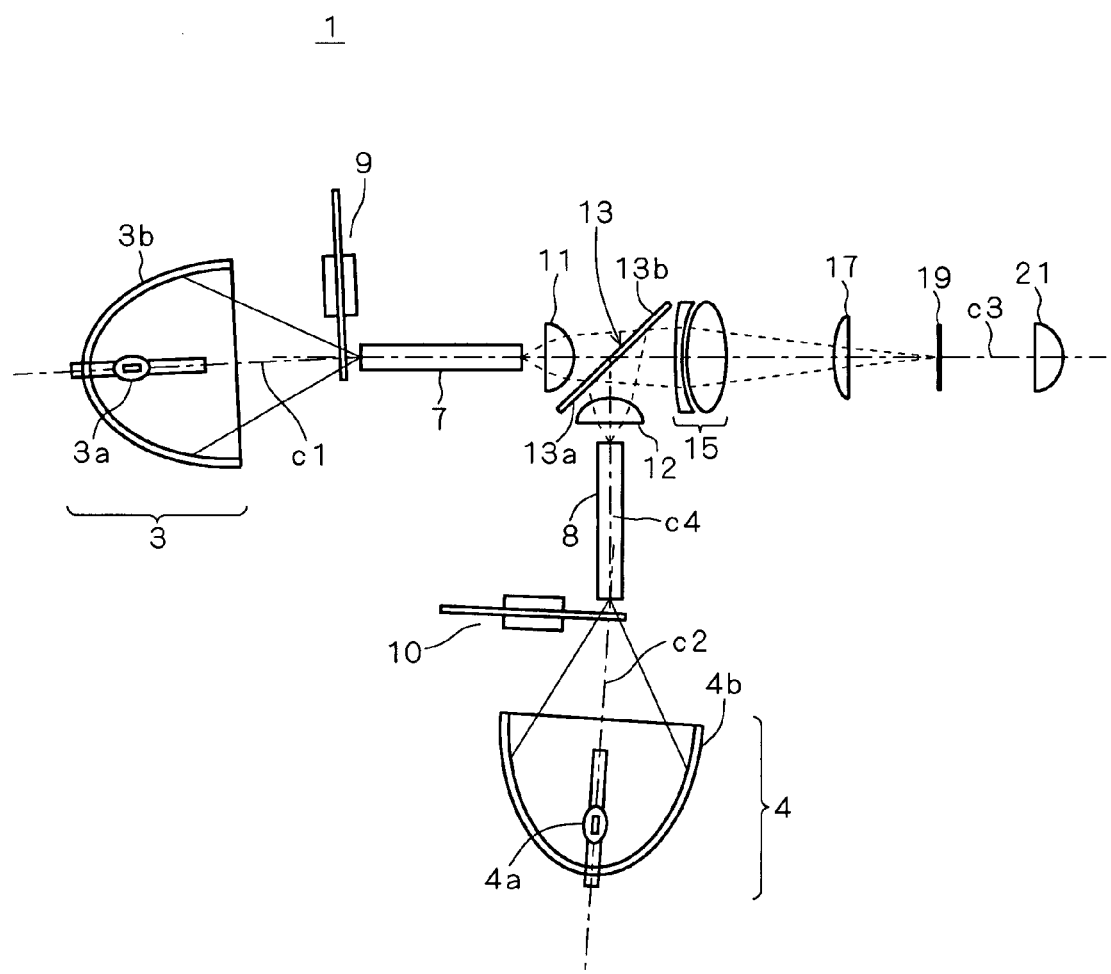
FIG. 1 is a schematic view showing a projection display according to a first preferred embodiment of the present invention.

As shown in FIG. 1, a projection display 1 according to the present embodiment includes first and second light sources 3 and 4, a first optical integrator 7 provided behind the first light source 3, a second optical integrator 8 provided behind the second light source 4, a first color wheel 9 provided in front of a light-incident face of the first optical integrator 7, a second color wheel 10 provided in front of a light-incident face of the second optical integrator 8, a first lens 11 provided behind the first optical integrator 7, a second lens 12 provided behind the second optical integrator 8, a reflection/transmission member 13 provided behind the first and second lenses 11 and 12, a lens group 15 provided behind the reflection/transmission member 13, a field lens 17 provided behind the lens group 15, a light valve 19 provided behind the field lens 17, and a projection lens 21 provided behind the light valve 19.

The first and second light sources 3 and 4 are respectively made up of first and second lamps 3a and 4a such as a ultra high pressure mercury lamp, a xenon lamp or the like and first and second concave mirrors (e.g., elliptical mirrors) 3b and 4b which condense light from the first and second lamps 3a and 4a and convert the light into converging beams (first and second light beams), respectively. The reference character c1 in FIG. 1 indicates an optical axis of the first light source 3, and c2 indicates an optical axis of the second light source 4.

The first and second optical integrators 7 and 8 are each made of a transparent member formed like a prism having a rectangular cross section, and respectively receive light beams from the first and second light source 3 and 4 incident upon the light-incident faces which are their one side faces into the inside thereof, and the incident light beams are internally reflected off the inner surfaces, and emitted from the light-outgoing faces which are their other side faces, respectively. As is well known, it is preferable in terms of efficiency in light utilization that the first and second optical integrators 7 and 8 be provided such that their light-incident faces are positioned at focal points of the light beams from the first and second light sources 3 and 4, respectively. Accordingly, it is preferable that the first and second optical integrators 7 and 8 be used respectively in combination with the light sources 3 and 4 provided with elliptical mirrors 3b and 4b as in the present embodiment, or in combination with light sources each having a parabolic mirror and a condenser lens.

The first and second color wheels 9 and 10 are chemical components often used for colorization in a single-chip light valve system, and each have a plurality of dichroic mirrors of different spectral transmittances (or spectral characteristics) arranged annularly via a motor hub about a rotary shaft of a rotation motor. With the rotation of the rotary shaft, the respective dichroic mirrors are selectively disposed on optical paths of light beams from the first and second light sources 3 and 4, so that the light beams (white light) from the first and second light sources 3 and 4 are converted into desired color light by time division.

In the present embodiment, the first and second light sources 3 and 4 are lit up in synchronization with each other. The first color wheel 9 rotates in synchronization with the lighting of the first light source 3, and the second color wheel 10 rotates in synchronization with the lighting of the second light source 4. The light beams from the first and second light sources 3 and 4 are thereby converted into light of the same color by the first and second color wheels 9 and 10 at the same time, and propagate to a later stage.

The first lens 11, lens group 15 and field lens 17 constitute an image-forming system having a conjugate space between the light-outgoing surface of the first optical integrator 7 and light valve 19. These optical elements 11, 15 and 17 share a common optical axis c3, and specific light source images (hereinafter referred to as a first light source image group 23) defined by the design specifications of the first optical integrator 7 and first lens 11 are formed in a space between the first lens 11 and lens group 15.

The second optical integrator 8 and second lens 12 share a common optical axis c4, and specific light source images (hereinafter referred to as a second light source image group 24) defined by the design specifications of the second optical integrator 8 and second lens 12 are formed in the vicinity of the first light source image group 23.

The reflection/transmission member 13 partially transmits the light beam from the first optical integrator 7 (i.e., the light beam from the first light source 3) and partially reflects the light beam from the second optical integrator 8 (i.e., the light beam from the second light source 4) in a direction that the light beam from the first optical integrator 7 is transmitted (i.e., along the optical axis c3).

Figure 2:
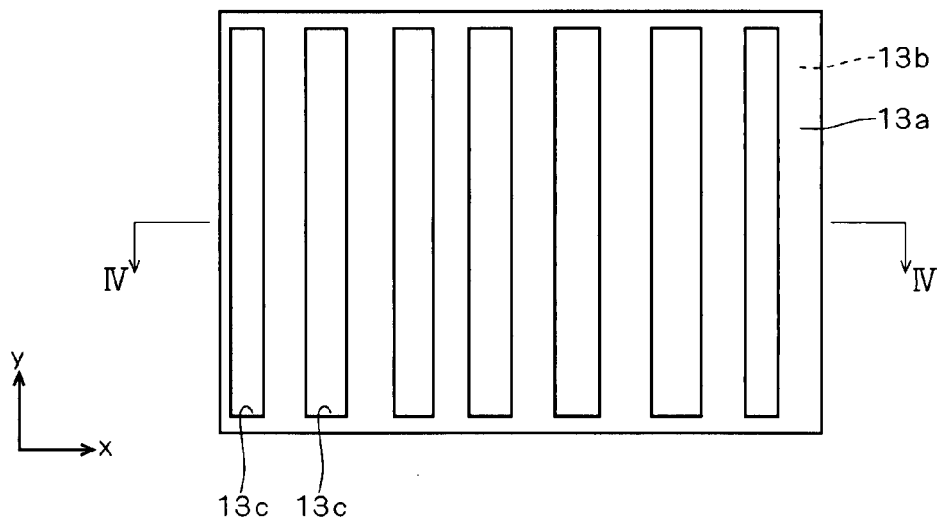
FIG. 2 is a schematic view showing a reflection/transmission member according to the first preferred embodiment.

More specifically, the reflection/transmission member 13 is of, e.g., a rectangular plate-like shape as shown in FIG. 2, and has as a reflective surface 13a which is one side main surface, a light-shielding surface 13b which is the other side main surface, and a plurality of openings 13c extending through the both main surfaces 13a and 13b. The openings 13c are each formed in rectangular shape extending in a direction that the shorter sides of the main surfaces of the reflection/transmission member 13 extend, and are arranged in parallel at a predetermined distance from each other in the direction that the longer sides of the main surfaces of the reflection/transmission member 13 extend. This reflection/transmission member 13 is disposed at a predetermined angle relative to the optical axis c3 in the space between the first lens 11 and lens group 15. The light valve 19 is formed in rectangular shape, and the shorter sides of the main surfaces of the reflection/transmission member 13 extend in the same direction that the shorter sides of the main surfaces of the light valve 19 extend.

With such structure and arrangement, the reflection/transmission member 13 partially transmits the light beam from the first optical integrator 7 through the openings 13c from the light-shielding surface 13b to the reflective surface 13a, and partially reflects the light beam from the second optical integrator 8 by the reflective surface 13a in the direction that the light beam from the first optical integrator 7 is transmitted (i.e., along the optical axis c3).

In the present embodiment, since the first and second light sources 3 and 4 are lit up in synchronization with each other, the light beam from the first optical integrator 7 transmitted through the openings 13c of the reflection/transmission member 13 and light beam from the second optical integrator 8 reflected off the reflective surface 13a of the reflection/transmission member 13 are combined and propagate to a later stage. Herein, the reflection/transmission member 13 accordingly serves as a combining device (combining mirror) for combining the light beams from the first and second optical integrators 7 and 8.

The shape and arrangement of the openings 13c of the reflection/transmission member 13 are determined in such a manner that relatively high intensity portions in the distribution of the light beam from the first optical integrator 7 are selectively transmitted through the openings 13c.

Figure 3:
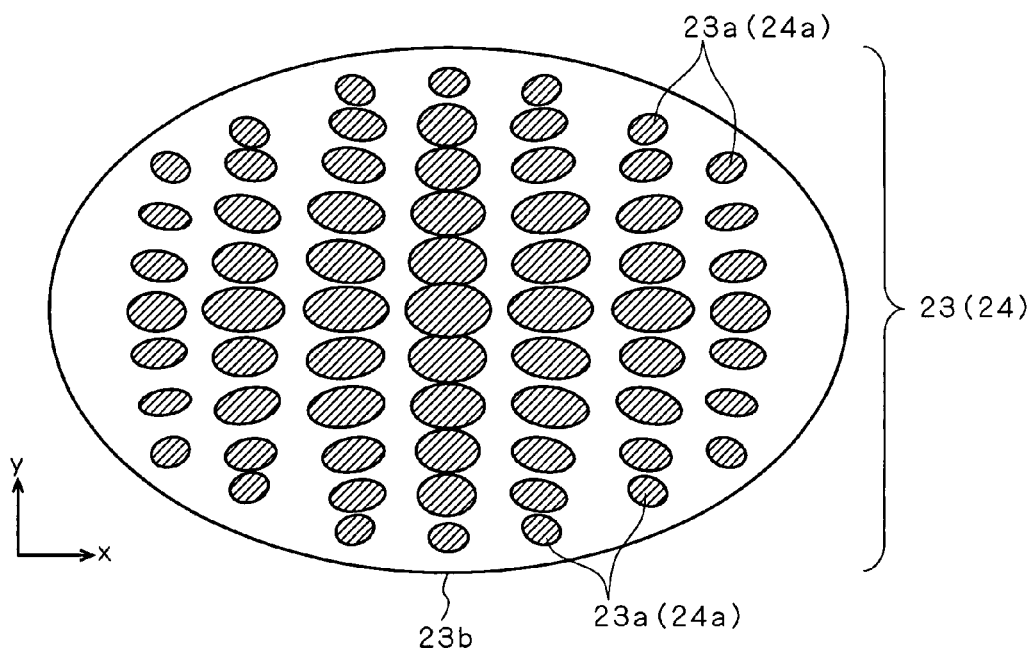
FIG. 3 is a schematic view showing a light source image group according to the first preferred embodiment.

More specifically, the determination is made as described below. FIG. 3 is a schematic view showing the light source image group 23 (24) formed on the main surface 13a (13b) of the reflection/transmission member 13. A plurality of elliptical areas 23a (24a) in the drawing schematically indicate the intensity distribution of the respective light source images. That is, in the light source image group 23 (24), the plurality of elliptical areas 23a (24a) are arrayed at a relatively shorter distance from each other along the shorter side of the reflection/transmission member 13 (in the direction y) and at a relatively longer distance from each other along the longer side of the reflection/transmission member 13 (in the direction x) (that is, the light source image group 23 (24) is formed such that dense portions and isolated portions of the plurality of elliptical areas 23a (24a) are arrayed alternately to form stripes). The dense portions corresponds to the relatively high intensity portions in the distribution of light beam, and the isolated portions corresponds to the relatively low intensity portions of light beam. The number of and pitches between the light source images 23a in the vertical and horizontal directions are obtained from this density distribution (intensity distribution), and the shape and arrangement of the openings 13c are determined on the basis of the obtained number of and pitches between the light source images 23a in the vertical and horizontal directions.

Generally, to make the first optical integrator 7 have a cross section almost similar to that of the light valve 19 (e.g., rectangular), the projection display 1 is preferably constructed such that an optical (circular) spot of the light beam condensed by the first concave mirror 3b is circumscribed with the shorter side of the cross section of the first optical integrator 7. In this case, since the difference in light intensity is greater along the longer side of the cross section of the first optical integrator 7, light source images are likely to be observed as discretely distributed as shown in FIG. 3, while adjacent light source images are disposed densely along the shorter side of the cross section of the first optical integrator 7. Considering these, it is preferable that the openings 13c of the reflection/transmission member 13 have a rectangular shape extending along the shorter sides of the main surfaces of the reflection/transmission member 13, as shown in FIG. 2.

An ellipse 23b in FIG. 3 schematically indicates the range where the light source image group 23 formed on the reflection/transmission member 13 is distributed. The reason why the range of distribution of the light source image group 23 is elliptical is because the reflection/transmission member 13 is disposed at an angle relative to the optical axis c3. As is well known, the shape of the ellipse 23b and the number of and pitches between the light source images 23a in the vertical and horizontal directions formed in the ellipse 23b depend upon the design specifications of the first light source 3, first optical integrator 7 and first lens 11 (e.g., the condensing angle of the first light source 3, the cross sectional dimensions of the first optical integrator 7 and its length along the optical axis, the convergence and light receiving angle of the first lens 11). This means that changes in these design specifications can control the number of and pitches between the light source images 23a in the vertical and horizontal directions so as to be suitable for the shape and arrangement of the openings 13c of the reflection/transmission member 13.

The optical axis c4 common to the second optical integrator 8 and second lens 12 is determined such that the relatively high intensity portions of the light beam from the second optical integrator 8 (the dense portions in the stripes of the light source images 24a) are selectively reflected off the reflective surface 13a of the reflection/transmission member 13 in the direction that the light beam from the first optical integrator 7 is transmitted (along the optical axis c3).

Figure 4:
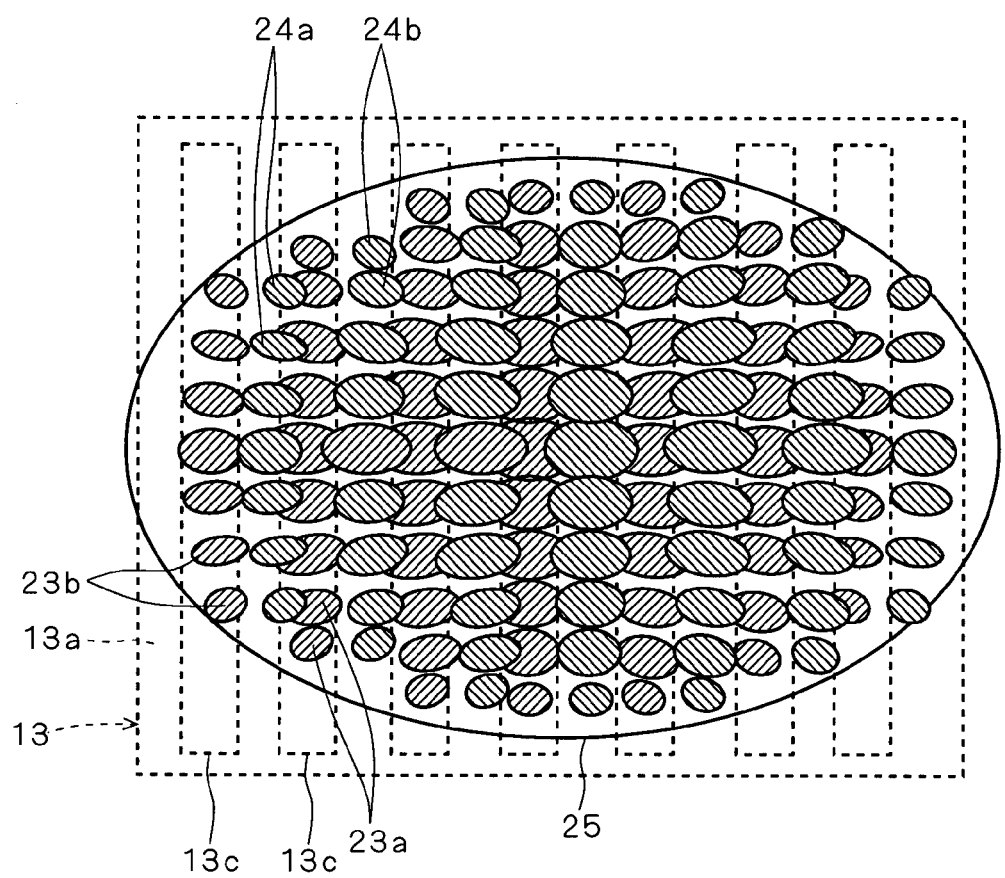
FIG. 4 is a schematic view showing a light source image group formed on the reflection/transmission member according to the first preferred embodiment.

In other words, as shown in FIG. 4, the optical axis c4 is determined to be inclined at a predetermined angle relative to the optical axis c2 such that the relatively high intensity portions of the light beam from the second optical integrator 8 (the dense portions in the stripes of the light source images 24a) are superimposed on the relatively low intensity portions of the light beam from the first optical integrator 7 (the isolated portions in the stripes of the light source images 23a).

Herein, the dense portions and isolated portions in the stripes of the light source image groups 23 and 24 are of almost the same shape and dimensions, so that the angle of the optical axis c4 is determined such that the light source image group 24 is displaced from the light source image group 23 by one pitch in the direction that the dense portions and isolated portions alternate.

As described above, the light beams from the first and second optical integrators 7 and 8 are combined by the reflection/transmission member 13 to produce a composite light beam 25, which has an intensity distribution as shown in FIG. 4 where the relatively high intensity portions of the light beam from the second optical integrator 8 (the dense portions in the stripes of the light source images 24a) are superimposed on the relatively low intensity portions of the light beam from the first optical integrator 7 (isolated portions in the stripes of the light source images 23a), resulting in a uniform intensity distribution only having relatively high intensity portions as a whole.

Figure 5A:
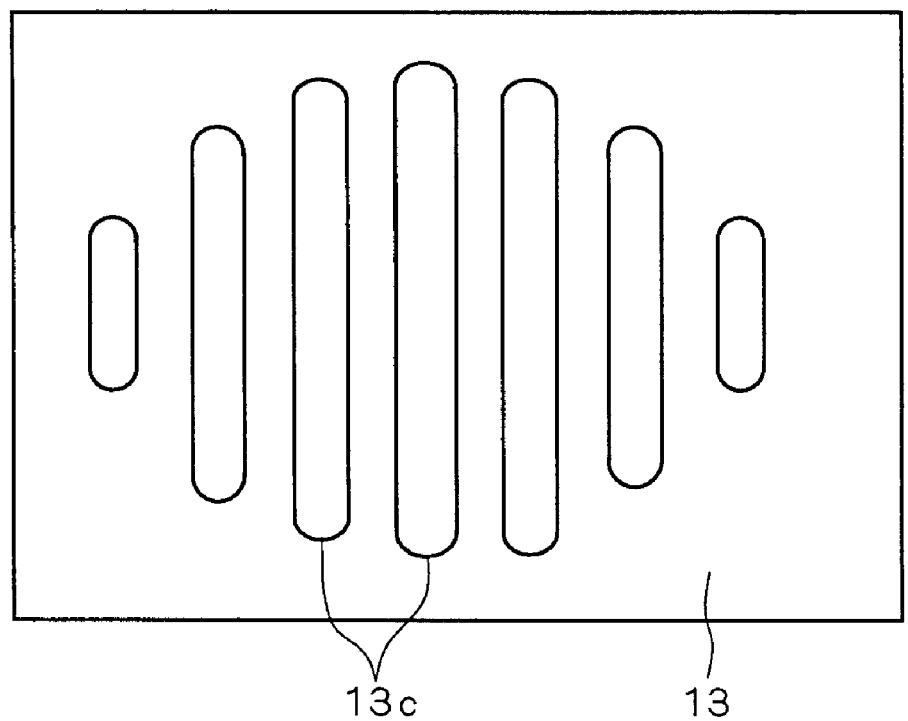
FIGS. 5A and 5B are schematic views each showing a specific example of the reflection/transmission member according to the first preferred embodiment.
Figure 5B:
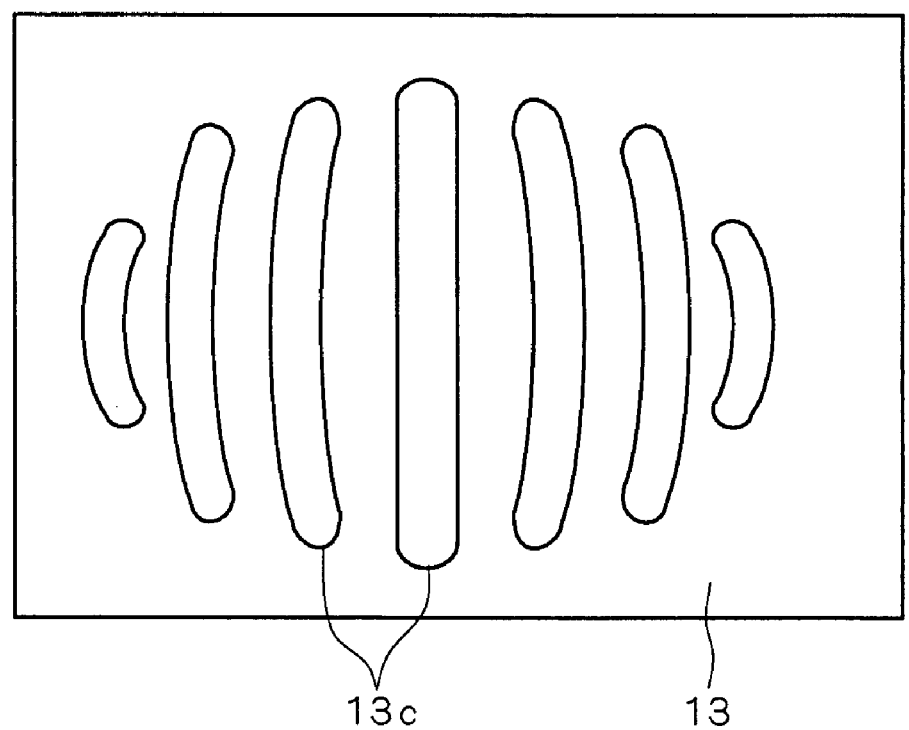

The pitches between the light source images 23a in the vertical and horizontal directions are obtained as follows: for example, using the first concave mirror 3b on which the light beam from the first light source 3 is incident at 30 degrees at a half angle (i.e., f-number is approximately 1) and when the light beam from the first light source 3 is internally reflected within the first optical integrator 7 three times in the direction of the longer side of the cross section and five times in the direction of the shorter side of the cross section like the light source image group 23 shown in FIG. 3, the pitch between the light source images 23a in the horizontal direction formed on the reflection/transmission member 13 (in the direction corresponding to the longer side of the cross section of the first optical integrator 7) is obtained as about 8.6 degrees (by dividing 60 degrees by 7) on an angular basis, assuming that the pitch is equal. On the other hand, the pitch between the light source images 23a in the vertical direction (in the direction corresponding to the shorter side of the cross section of the first optical integrator 7) is obtained as about 5.5 degrees (by dividing 60 degrees by 11). Actually, computer simulations allow the distribution of the light source images 23a formed on the reflection/transmission member 13 in a designed illumination optical system to be obtained with accuracy, and therefore, the optimum shape and arrangement of the openings 13c of the reflection/transmission member 13 can easily be determined on the basis of the distribution of the light source images 23a thus obtained. The shape of the openings 13c is not limited to rectangle as shown in FIG. 2, but may be of elliptical shape as shown in FIG. 5A or elliptical shape slightly bent toward the outside as shown in FIG. 5B. When the openings 13c are formed by secondary processing, it is preferable for facilitating processing that the openings 13c have their both ends almost rounded as shown in FIGS. 5A and 5B. The openings 13c may be of rectangular shape in FIG. 5A, or rectangular shape slightly bent toward the outside in FIG. 5B. In FIG. 2, the openings 13c may be of elliptical shape.

It is important how optical losses in the reflection/transmission member 13 are reduced when a light beam 3c from the first light source 3 is transmitted through the openings 13c and a light beam 4c from the second light source 4 is reflected off the reflective surface 13a. For this purpose, the inner surface 13d of each opening 13c is designed to be in parallel to the direction that the light beam 3c from the first light source 3 is transmitted. This can reduce the proportion that the light beam 3c from the first light source 3 is lost on the inner surface 13d. Such design does not arise any problem in optical losses with respect to the reflection of the light beam 4c by the reflective surface 13a.

For the reflection/transmission member 13, a surface mirror obtained by providing reflective coating on a typical glass base material. The reflection/transmission member 13 serves as a window in which the plurality of openings 13c are arrayed with respect to the light beam 3c from the first light source 3, and serves as a reflecting mirror with respect to the light beam 4c from the second light source 4. This means that the base material of the reflection/transmission member 13 does not need to be transparent like glass, but may be a resin base material such as plastic or a metal plate. When a metal plate is used, the reflection/transmission member 13 may be formed by subjecting the metal plate to mirror-like finishing on its surface to provide a high reflectance, and providing the openings 13c therein by secondary processing. To reduce optical losses of the composite light beam produced by the reflection/transmission member 13 as much as possible, the reflection/transmission member 13 is preferably formed as thin as possible. For the purpose of reducing optical losses, it is also preferable to make the inner surface 13d of the reflection/transmission member 13 a reflective surface.

The degree of the efficiency in light utilization of the composite light beam produced by the reflection/transmission member 13 can be judged based on how much the shape and size of the light source image group 25 of the composite light beam are close to those of the light source image group 23 of the light beam originating at the single light source 3. This is because, when the size of a light source image group formed on the pupil of the projection lens 21 and the diameter of the pupil of the projection lens are equal, the illumination optical system and projection optical system are consistent with each other to the greatest degree, resulting in the highest efficiency in light utilization.

Figure 7:
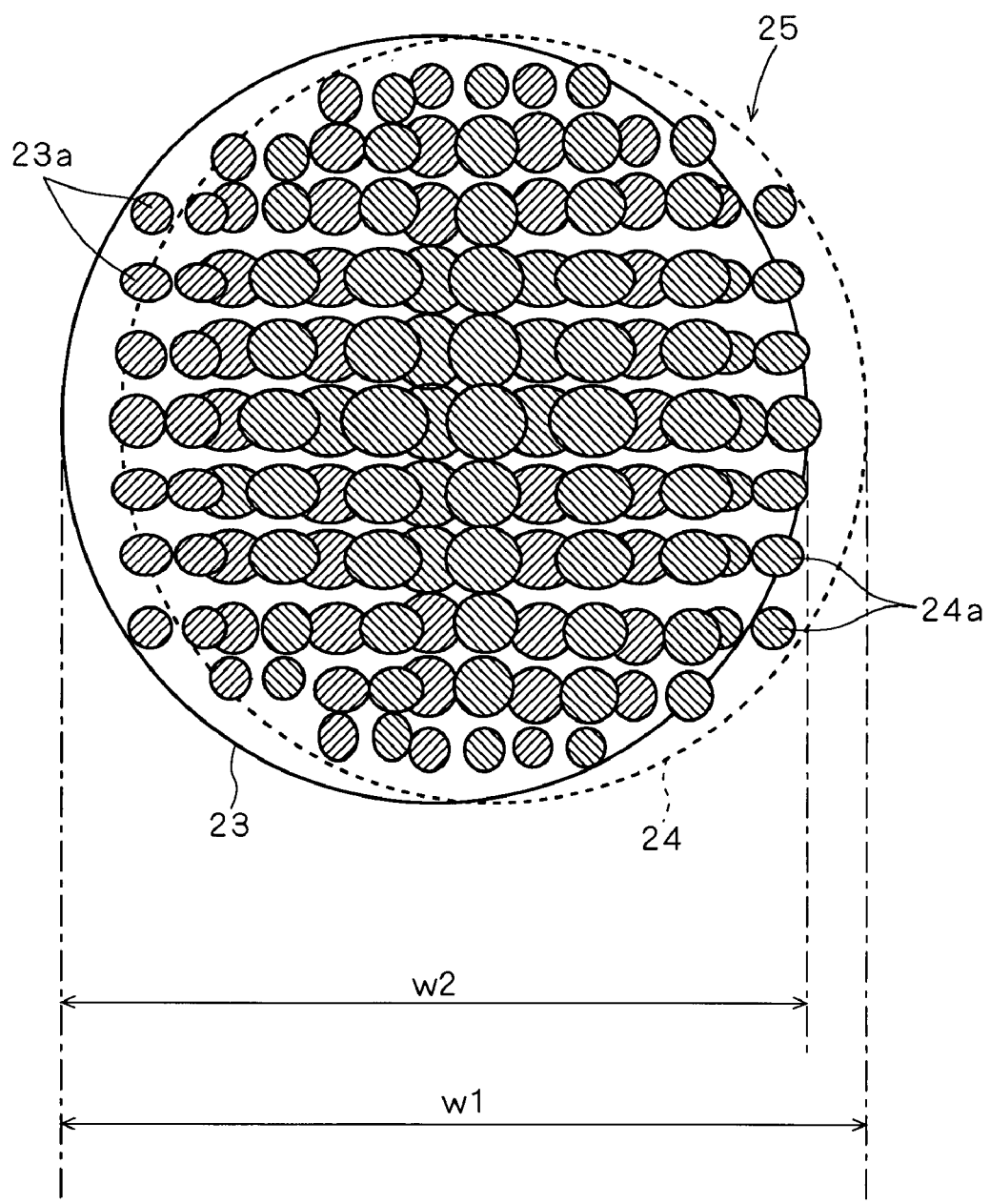
FIG. 7 is a schematic view showing a light source image group according to the first preferred embodiment.

As described above, in the case where the light source image group 25 of the composite light beam is produced by superimposing the light source image groups 23 and 24 of the light beams from the respective light sources 3 and 4 on each other with one pitch of the stripes displaced from each other, losses in efficiency in light utilization can be minimized by designing the pupil of the projection lens 21 to have a great diameter (hence, reducing the f-number of the projection lens 21) in accordance with the width W1 of the light source image group 25 of the composite light beam even when the width W1 exceeds the width W2 of the light source image group 23 of the light beam originating at the single light source 3, as shown in FIG. 7.

As described above, when the light beams from the light sources 3 and 4 are combined using the reflection/transmission member 13, the width W1 of the light source image group 25 of the composite light beam becomes almost equal to the width W2 of the light beam originating at the single light source 3, as shown in FIG. 7. Therefore, the reduction in the f-number of the projection lens 21 for minimizing the losses in efficiency in light utilization can be limited up to a several percent at most, which readily prevents an increase in cost of the projection lens 21.

Figure 6:
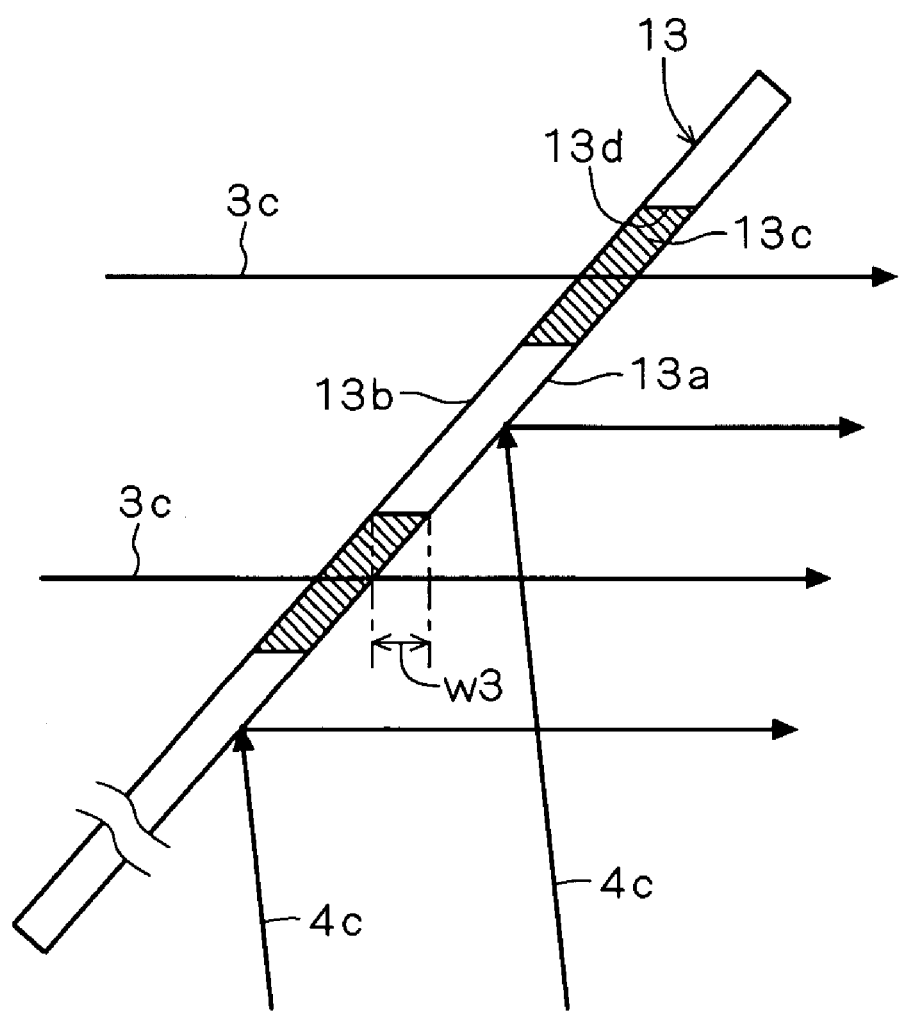
FIG. 6 is a schematic view (a sectional view taken along the line IV-IV in FIG. 2) showing an opening of the reflection/transmission member according to the first preferred embodiment.

To optimally combine the light source image groups 23 and 24 of the light beams from the respective light sources 3 and 4 (i.e., to produce a composite light beam with less optical losses and a uniform intensity distribution), the distributions of the light source image groups 23 and 24 on the reflection/transmission member 13 (i.e., how the light source image groups 23 and 24 are superimposed) and the position of the reflection/transmission member 13 need to be adjusted optimally. As shown in FIG. 8, defining the angle between the optical axes c3 and c4 as an angle $\alpha$, and the angle between the normal c6 to the reflection/transmission member 13 and optical axis c3 as an angle $\beta$, the distributions of the light source image groups 23 and 24 and the position of the reflection/transmission member 13 can be adjusted with accuracy by adjusting the angles $\alpha$ and $\beta$. Adjusting the angle $\alpha$ to be an obtuse angle and the angle $\beta$ to be an acute angle as shown in FIG. 8 allows (1) the reflection/transmission member 13 to be more perpendicular to the optical axis c3, and (2) the distributions of the light source image groups 23 and 24 to become close to the same shape (herein, circle). As a result of (1), the width W3 (the dimension along the optical axis c3; FIG. 6) of the inner surface 13d of each opening 13c of the reflection/transmission member 13 can be reduced, which in turn reduces optical losses at the inner surface 13d of each opening 13c. As a result of (2), the pitches of the stripes in the distributions of the light source image groups 23 and 24 can be aligned with each other, so that a composite light beam with a uniform intensity distribution can be produced.

Another method of adjusting the distributions of the light source image groups 23 and 24 is to incline the optical axes c1 and c2 of the light sources 3 and 4 relative to the optical axes c3 and c4 of the optical integrators 7 and 8, respectively. In FIG. 1, the optical axis c1 of the first light source 3 is slightly inclined relative to the optical axis c3 of the first optical integrator 7, and the optical axis c2 of the second light source 4 is slightly inclined relative to the optical axis c4 of the optical integrator 8. With such arrangement, the position of the light source image groups 23 and 24 on the reflection/transmission member 13 can be adjusted with accuracy. In this case, it is preferable to change the arrangement of the color wheels 9 and 10 in accordance with the displacements of the light sources 3 and 4. For example, the color wheel 9 (10) and light source 3 (4) may be disposed on the same stage to fix their positional relationship, and the stage itself may be inclined to adjust the angle of the optical axis c1 (c2) of the light source 3 (4). As a matter of course, since the position of the light source optical groups 23 and 24 can previously be specified in the design procedure, angle-adjusting mechanisms for the respective elements provided in the projection display 1 may be selected or omitted according to necessity.

In either method of adjusting the distributions of the light source image groups 23 and 24, the relationship in image production between the lens systems 11, 12, 15 and 17 provided between the optical integrators 7, 8 and light valve 19 is not changed by the adjustment, which means that it is unnecessary to consider the possibility of optical losses in illumination of the light valve 19 due to the displacement between an illuminating area and illuminated area.

The operation of the projection display 1 will now be described with reference to FIG. 1. When the first and second light sources 3 and 4 are lit up at the same time, the light beams from the light sources 3 and 4 are transmitted through the color wheels 9, 10, optical integrators 7, 8 and lenses 11, 12, respectively, to propagate to the light-shielding surface 13b and reflective surface 13a of the reflection/transmission member 13, respectively. At this time, the light beams from the light sources 3 and 4 are converted into desired color light by the color wheels 9 and 10, respectively, by time division, and are made uniform in lightness by the optical integrators 7 and 8.

Then, relatively high intensity portions of the light beam from the first light source 3 propagated to the light-shielding surface of the reflection/transmission member 13 (i.e., the dense portions in the stripes of the distribution of the light source image group 23) are selectively transmitted through the openings 13c of the reflection/transmission member 13. Concurrently, relatively high intensity portions of the light beam from the second light source 4 propagated to the reflective surface 13a of the reflection/transmission member 13 (i.e., the dense portions in the stripes of the distribution of the light source image group 24) are selectively reflected off the reflective surface 13a in the direction that the light beam from the first light source 3 is transmitted. The light beams from the first and second light sources 3 and 4 are thereby combined such that the relatively high intensity portions of the light beam from the second light source 4 (i.e., dense portions in the stripes of the distribution of the light source image group 24) are superimposed on the relatively low intensity portions of the light beam from the first light source 3 (i.e., isolated portions in the stripes of the distribution of the light source image group 23) by the reflection/transmission member 13. Thus produced composite light beam has a uniform intensity distribution with the distribution of the light source image group 25 maintained at almost the same shape as the distribution of the light source image group 23 from the first light source 3.

The composite light beam produced as described above is transmitted through the lens group 15 and field lens 17 to be uniformly irradiated onto the light valve 19, and is converted into an optical image by the light valve 19 in accordance with a video signal. The converted optical image is projected under magnification on a predetermined screen by the projection lens 21, to be displayed as a large-scale image on the screen.

A small high-resolution device such as a digital micromirror device (DMD), a liquid crystal device or the like is suitable for the light valve 19. Although not illustrated, the projection lens may be configured in various manners as, for example, a front projection display provided with a reflective screen or a rear projection display combined with a transmissive screen.

The projection display 1 constructed as above described includes the reflection/transmission member 13 which partially transmits the first light beam from the first light source 3 and partially reflects the second light beam from the second light source 4, and the reflection/transmission member 13 has the reflective surface 13a which is one side main surface, the light-shielding surface 13b which is the other side main surface, and a plurality of openings 13c extending through the both main surfaces 13a and 13b. The first light beam is transmitted through the openings 13c from the light-shielding surface 13b toward the reflective surface 13a and the second light beam is reflected off the reflective surface 13a in the direction that the first light beam is transmitted. Accordingly, the first and second light beams can be combined by the reflection/transmission member 13 by concurrent lighting of the first and second light sources 3 and 4, and the composite light beam has an aspect ratio almost equal to the aspect ratio (1:1) of the light beam originating at the single light source 3, which achieves a higher efficiency in light utilization than in conventional cases (where the aspect ratio is 2:1).

Further, since the composite light beam has an aspect ratio almost equal to the aspect ratio (1:1) of the light beam originating at the single light source 3, the lenses 15, 17 and 21 do not need to have a great diameter, which achieves low-cost construction.

Since the first and second light beams are not condensed on one spot from a structural view point unlike conventional cases, it is not necessary to use a high heat-resistant material, which is advantageous in reliability in terms of heat resistance and costs.

Since the relatively high intensity portions of the first light beam are transmitted through the openings 13c of the reflection/transmission member 13, and the relatively high intensity portions of the second light beam are reflected off the reflective surface 13a of the reflection/transmission member 13, a displayed image can be prevented from decreasing in lightness and the uniformity in lightness can be maintained even when the light beams from the light sources 3 and 4 are partially transmitted or reflected.

Since the plurality of openings 13c are arrayed in parallel at a predetermined distance from each other and each have a rectangular or elliptical shape, a displayed image can efficiently be prevented from decreasing in lightness and the uniformity in lightness can be maintained when the relatively low and high intensity portions of each of the first and second light beams are alternately arranged in stripes. Particularly when each opening 13c has an elliptical shape (i.e., when the both ends of each opening 13c is formed in half-round), the openings 13c can easily be formed in secondary processing.

When the plurality of openings 13c are arrayed in parallel at a predetermined distance from each other and each have a rectangular or elliptical shape bent toward the outside, a displayed image can efficiently be prevented from decreasing in lightness and the uniformity in lightness can be maintained when the relatively low and high intensity portions of each of the first and second light beams are alternately arranged in stripes to be bent toward the outside. Particularly when each opening 13c has a rectangular or elliptical shape bent toward the outside (i.e., when the both ends of each opening 13c are formed in semi-circle), the openings 13c can easily be formed in secondary processing.

Since the inner surface 13d of the openings 13c is formed in parallel to the direction that the first light beam is transmitted, the proportion that the light beam 3c is lost at the inner surface 13d of the openings 13c can be reduced.

The reflection/transmission member 13 is disposed behind the first lens 11 provided behind the first optical integrator 7 and disposed behind the second lens 12 provided behind the second optical integrator 8, and thus can be prevented from being exposed to heat of the light sources 3 and 4, which advantageously increases design flexibility in terms of material selection and precision machining of the reflection/transmission member 13.

Since the transmitted light of the first light beam and reflected light of the second light beam are combined by the reflection/transmission member 13 by the concurrent lighting of the first and second light sources 3 and 4, the first and second light beams can be combined with high efficiency in light utilization, high reliability in terms of heat resistance and at low costs.

The present first embodiment has only shown main components of the projection display 1, and it is apparent that other components may have various specs and shapes within the bounds not deviating from the scope of the present invention. For example, the first and second optical integrators 7 and 8 are generally divided into the type of representing a hollow pipe shape with its inner surface serving as a reflective surface and the type of a rectangular solid made of a transparent material such as glass which utilizes total reflection on its inner surface. Either type may be employed in the present invention.

Figure 9:
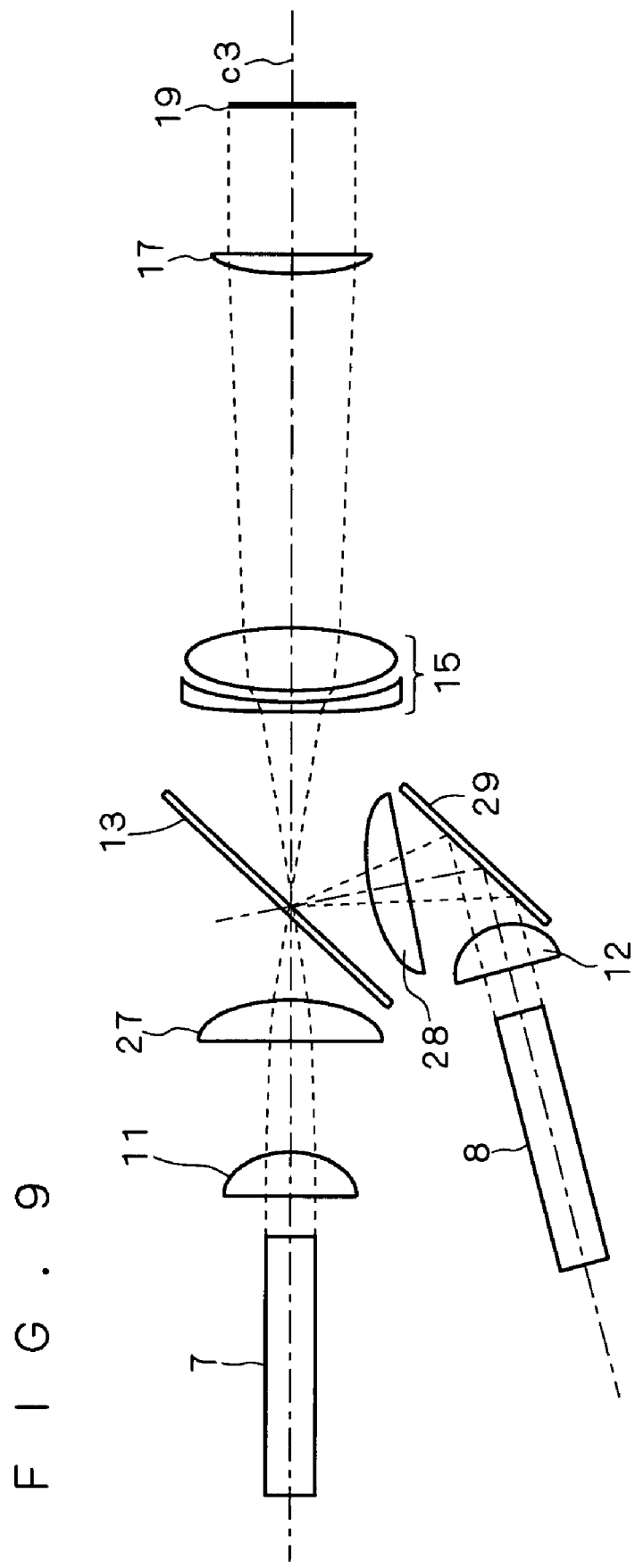
FIG. 9 is a schematic view showing another arrangement of the light sources according to the first preferred embodiment.

Further, as shown in FIG. 9, lenses 27 and 28 may be provided between the lenses 11, 12 and lens group 15, respectively, to thereby reduce the aberration of optical light source images formed in the later stage to increase the combining efficiency. A reflecting mirror 29 may additionally be provided between the lenses 12 and 28, to greatly change the arrangement of the second light source 4 (not shown). This is effective in making the projection display compact as a whole.

Generally, since it is more flexible and less difficult to design an illumination system than a projection optical system, providing the additional reflecting mirror 29 in the illumination system as shown in FIG. 9 to deflect the optical path allows the two light sources 3 and 4 to be positioned suitably for the layout of the whole projection display. In this case, the reflection/transmission member 13 also made of a simple mirror element is very advantageous in considering deflection of the optical path. That the deflection of the optical path can be designed with flexibility is advantageous in designing, e.g., a cooling air path, and advantageous also in terms of increasing the flexibility in replacing and arranging the lamps 3a and 4a.

Further, the present embodiment has shown one main light source (first light source 3) and one secondary light source (second light source 4), however, the light sources 3 and 4 may each have a plurality of reflecting mirrors or a plurality of lamps.

Second Preferred Embodiment

Figure 10:
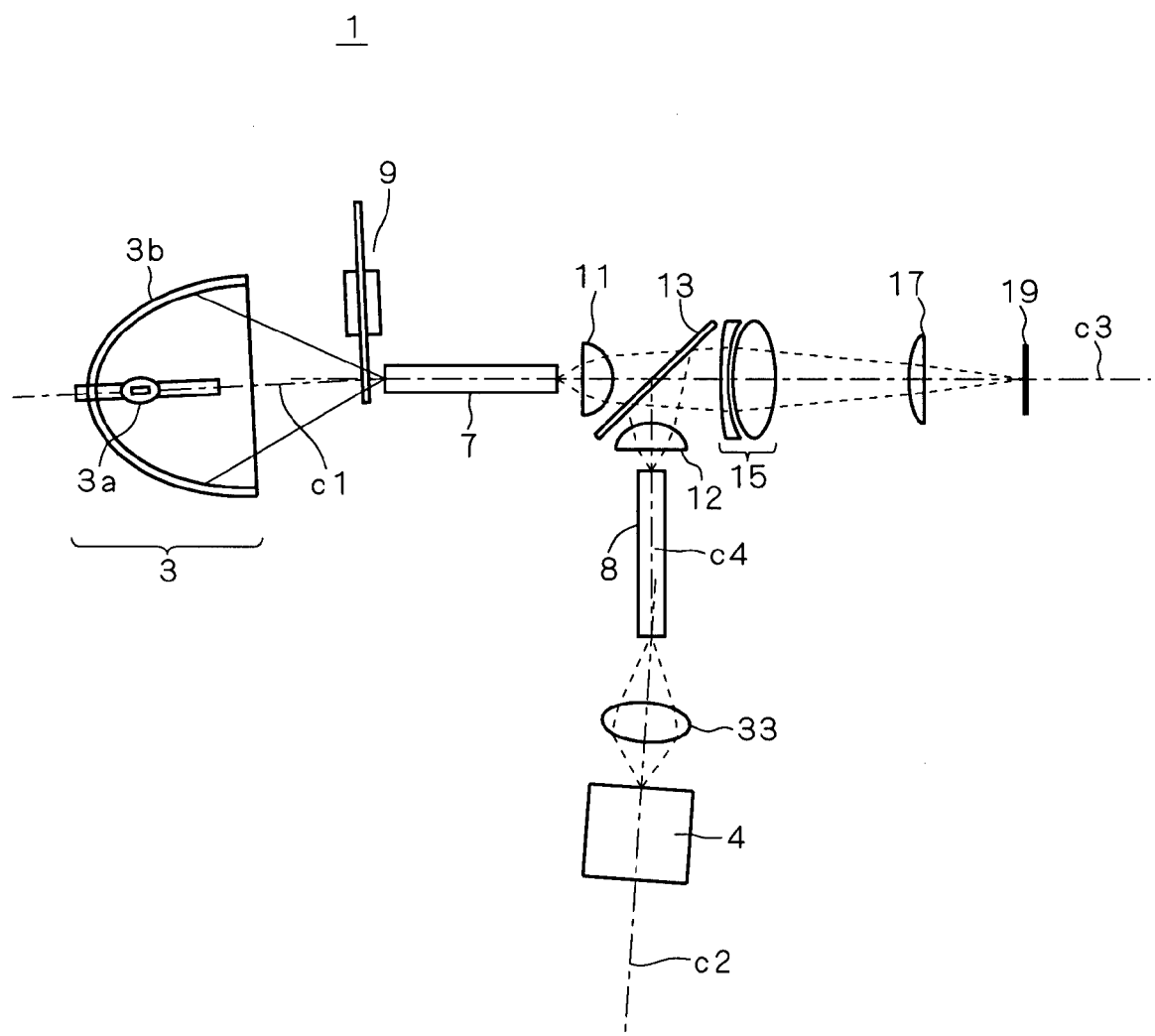
FIG. 10 is a schematic view showing a projection display according to a second preferred embodiment of the present invention.

As shown in FIG. 10, a projection display 1B according to the present embodiment differs from the projection display 1 according to the first preferred embodiment in that a single-color light source having a narrow-band emission wavelength such as an LED or a semiconductor laser is used as the second light source 4, and the second color wheel 10 is replaced with a lens 33 provided between the second light source 4 and second optical integrator 8 for efficiently condensing the single color light from the second light source 4 to be directed to the second optical integrator 8. In FIG. 10, components having the same functions as those in the first preferred embodiment are indicated by the same reference characters, and repeated explanation is thus omitted.

Particularly when a metal halide lamp or a ultrahigh pressure mercury lamp is used as the first and second light sources 3 and 4 in the first preferred embodiment, a red component of the respective color components of the light from each of the light sources 3 and 4 has a low relative intensity. Thus, the red component is likely to be lacking when white color is going to be produced by combining RGB primary colors. In such case, the use of a red single-color light source as the second light source (secondary light source) 4 for the purpose of compensating for the lack of red color of the first light source (main light source) 3 allows the red light from the second light source to be efficiently be combined with the light from the first light source 3 by the reflection/transmission member 13, which solves the lack of the red color component of the light from the first light source 3.

A single-color light source to be used as the second light source 4 may be one that emits single color light such as green or complementary cyan in addition to red light in accordance with a color component lacking in the light from the first light source 3.

Third Preferred Embodiment

Figure 11:
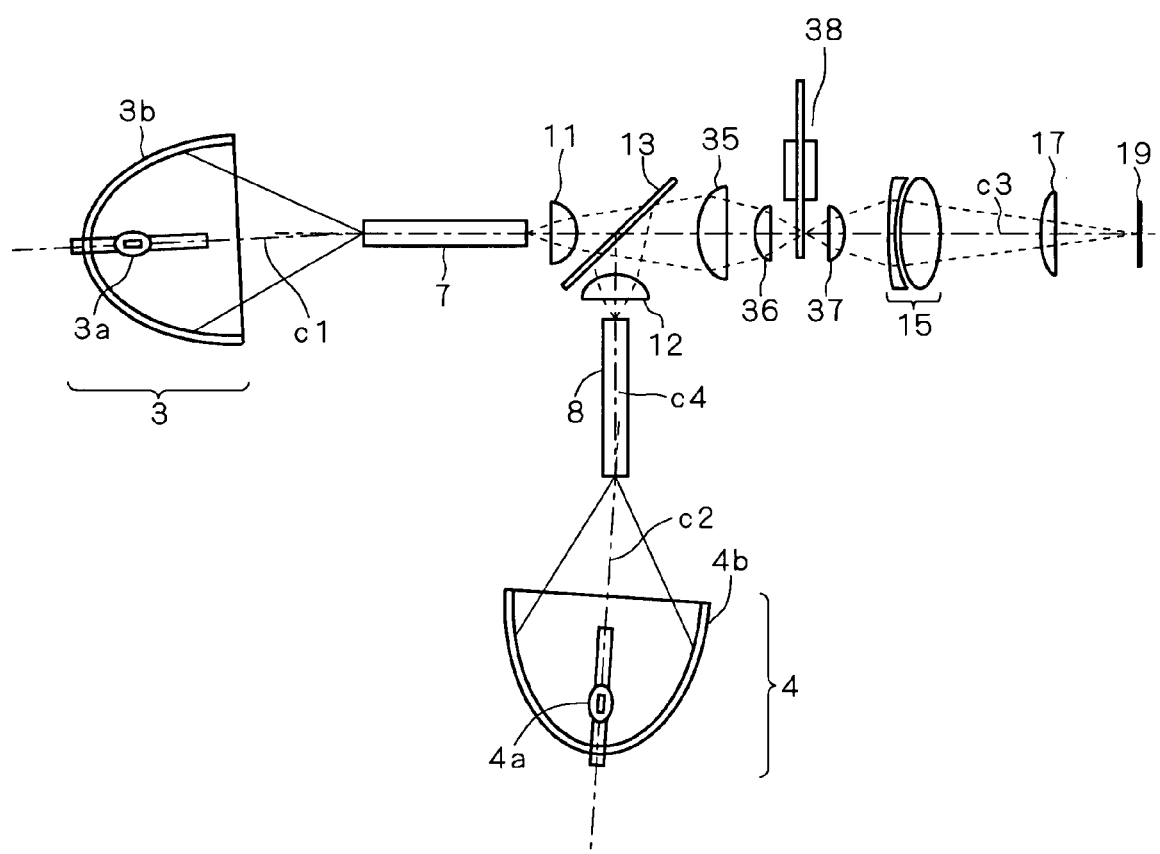
FIG. 11 is a schematic view showing a projection display according to a third preferred embodiment of the present invention.

As shown in FIG. 11, a projection display IC according to the present embodiment differs from the projection display 1 according to the first preferred embodiment in that the first and second color wheels are replaced with condenser lenses 35, 36 and 37 between the reflection/transmission member 13 and lens group 15, and a single color wheel 38 is provided between the condenser lenses 35 and 36. A conjugate surface with the light-outgoing face of the first optical integrator 7 is formed between the condenser lenses 35 and 36. In FIG. 11, components having the same functions as those in the first preferred embodiment are indicated by the same reference characters, and repeated explanation is thus omitted.

In the present embodiment, the light beams from the light sources 3 and 4 are combined by the reflection/transmission member 13 and then color-converted by the color wheel 38.

With such arrangement, the first and second light sources 3 and 4 are lit up in synchronization with each other, and the single color wheel 38 is rotated in synchronization with the lighting. Thus, the control system is simpler than in the first preferred embodiment in which the two color wheels 9 and 10 are rotated in synchronization with the lighting of the light sources 3 and 4.

Further, since the color wheel 38 is provided away from the light sources 3 and 4, the influence of heat from the focal points of the light sources 3 and 4 can be reduced as compared to the first preferred embodiment.

While the construction of the projection display has been described in the first to third preferred embodiments including applications, the present invention has an principal objective to efficiently combine the light beams from the light sources 3 and 4 using a spatial distribution of light source images formed in the illumination optical system like compound eyes. More specifically, the objective is to spatially separate high intensity portions and low intensity portions of the light source images formed by the first light source 3 by the reflection/transmission member 13, and efficiently combine the light from the second light source 4 therewith while sacrificing the low intensity portions to some degree. The various applications described in the first preferred embodiment may also be applied to the second and third preferred embodiments, as a matter of course.

Fourth Preferred Embodiment

While the first and second light sources are lit up in synchronization with each other in the first preferred embodiment, one of the first and second light sources may be used as a main light source and the other one as a secondary light source which is lit up instead of the main light source when the lightness of the main light source is reduced to a predetermined value or below.

For that purpose, the projection display according to the first preferred embodiment may be provided with a lightness detecting device for detecting the lightness of the main light source and a lighting switching device for selectively lighting up the main light source and selectively lighting up the secondary light source when it is detected by the lightness detecting device that the lightness of the main light source is reduced to a predetermined value or below.

With such construction, the one light source is selectively lit up, and the other light source is selectively lit up when it is detected by the lightness detecting device that the lightness of the one light source is reduced to a predetermined value or below, which allows the apparent life of the light sources to be prolonged.

Since the uniformity in illumination of the light valve 19 is not impaired even when only one of the light sources is lit up, projection can be achieved without degrading the image quality. For example, a projection display having an apparent long life can be provided in which the second light source 4 is selected when a reduction in lightness of the first light source 3 with usage is detected.

Further, the use of an inexpensive halogen lamp or the like as the secondary light source can avoid a critical problem that an image becomes invisible because the secondary light source is promptly lit up even when the main light source fails to illuminate.

While the invention has been shown and described in detail, the foregoing description is in all aspects illustrative and not restrictive. It is therefore understood that numerous modifications and variations can be devised without departing from the scope of the invention.

What is claimed is:

1. A projection display comprising:
   a first light source and a second light source;
   a reflection/transmission member partially transmitting a first light beam from said first light source and partially reflecting a second light beam from said second light source; and
   a light valve converting a light beam from said reflection/transmission member into an optical image in accordance with a video signal, wherein
   said reflection/transmission member has a reflective surface which is one side main surface, a light-shielding surface which is the other side main surface, and a plurality of openings extending through both said one side main surface and said other side main surface, said first light beam being transmitted through said plurality of openings from said light-shielding surface to said reflective surface, and said second light beam being reflected off said reflective surface in a direction that said first light beam is transmitted.

2. The projection display according to claim 1, wherein
   a relatively high intensity portion of said first light beam is transmitted through said plurality of openings of said reflection/transmission member, and a relatively high intensity portion of said second light beam is reflected off said reflective surface of said reflection/transmission member.

3. The projection display according to claim 1, wherein
   said plurality of openings include a plurality of openings arrayed in parallel to each other at a predetermined distance, each being of rectangular or elliptical shape.

4. The projection display according to claim 2, wherein
   said plurality of openings include a plurality of openings arrayed in parallel to each other at a predetermined distance, each being of rectangular or elliptical shape bent toward the outside.

5. The projection display according to claim 1, wherein
   said plurality of openings each have an inner surface formed in parallel to the direction that said first light beam is transmitted.

6. The projection display according to claim 1, further comprising:
   a first optical integrator and a second optical integrator provided behind said first light source and said second light source, respectively; and
   a first lens and a second lens provided behind said first optical integrator and said second optical integrator, respectively, wherein
   said reflection/transmission member is provided behind said first lens and said second lens.

7. The projection display according to claim 1, wherein
   transmitted light of said first light beam and reflected light of said second light beam are combined by said reflection/transmission member by concurrent lighting of said first light source and said second light source.

8. The projection display according to claim 1, wherein
   one of said first and second light sources is a white light source and the other one of said first and second light sources is a single-color light source.

9. The projection display according to claim 1, further comprising:
   a lightness detecting device detecting lightness of one of said first and second light sources; and
   a lighting switching device selectively lighting up said one of said first and second light sources and selectively lighting up the other one of said first and second light sources when it is detected by said lightness detecting device that the lightness of said one of said first and second light sources is reduced to a predetermined value or below.

* * * * *